Nov. 25, 1952　　　J. F. KOHN　　　2,619,158

LEVER ACTUATED TIRE BEAD FORCING TOOL

Filed June 5, 1947

INVENTOR.
JOHN FRANCIS KOHN
BY

ATTORNEY

Patented Nov. 25, 1952

2,619,158

UNITED STATES PATENT OFFICE 2,619,158

LEVER ACTUATED TIRE BEAD FORCING TOOL

John Francis Kohn, Cleveland, Ohio

Application June 5, 1947, Serial No. 752,665

3 Claims. (Cl. 157—1.17)

This invention pertains to a tool for removing automobile tires from rims and more particularly for removing tires from safety rims which are designed to prevent a tire which goes flat from leaving the rim while the car is in motion.

An object of the invention is to provide a tool for easily removing tires from automobile rims.

A further object of the invention is to provide a tool for removing tires from automobile rims, which tool is readily adjustable for use with rims for various size.

Still another object of the invention is to provide a tool for applying pressure to a localized portion of a tire casing to force the localized area away from the tire rim.

Other objects and a fuller understanding of the invention may be had by referring to the specification, claims and the drawing wherein, Figure 1 is a side view of the tool.

Figure 1:
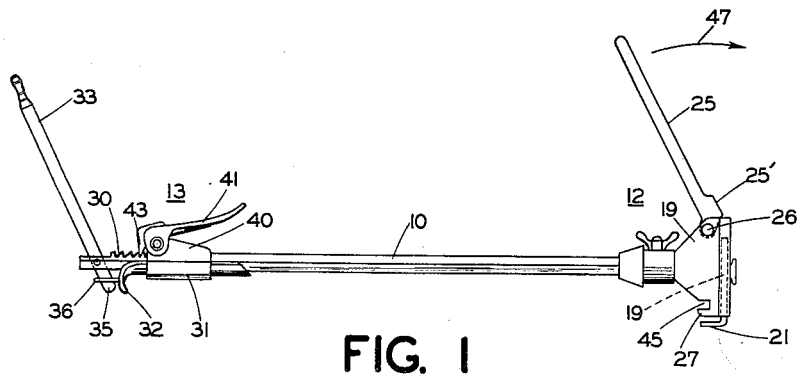

There has recently been introduced to the automobile trade a safety rim which is designed to prevent tires which have gone flat while the car is in motion from coming off of the rim. A disadvantage of such a rim is that it is very hard for a tire repair man to remove the tire casing when they are changing a tire. This necessitates the use of a tool having a high leverage ratio for forcibly separating the tire casing from the safety rim.

The tool is comprised of a long slender bar 10 having a leverage producing mechanism indicated generally by the reference character 12 mounted on one of its ends and a tightening mechanism indicated generally by the reference character 13 mounted on its other end. A collar 15 which is integral with the leverage producing mechanism 12 surrounds the bar 10 at the end where the leverage is produced and is slidable on the bar for providing a rough adjustment of the length of the tool to various sized rims. A wing nut 16 having a threaded pin which extends through the collar 15 to the bar, thus, in effect the bar 10 may be lengthened or shortened. To the end of the collar 15 there is connected a metal block 17 having two upwardly extending web portions 18, 19. Extending down through the metal block 17 is an opening 19 within which the metal bar 20 is slidably positioned. At its lower end the bar 20 is turned to provide a pressing foot 21. A handle 25 is provided on a shaft 26 connected between the two webs 18, 19 and the shaft 26 is located a short distance away from the bar 20. Thus the handle is rotatable about shaft 26 as an axis to apply pressure to the bar 20, and due to the ratio of the length of the handle 25 to the distance between the bar 20 and the shaft 26 the force exertable on the bar 20 is great. The block 17 at its lower edge carries a hook 27 which is adapted to engage the edge of a rim 28 for holding the leverage producing end of the bar 10 in place.

At the other end 13 of the bar 10 there is a number of ratchet teeth 30 and a metal collar 31 extends around the bar 10 at the location of the teeth. The collar is slidable on the bar 10 and it carries a hook 32 which is adapted to engage under the rim 28 at a point diametrically opposite the point where the hook 28 engages the rim, thus firmly securing the tool to the rim. A handle 33 is pivotally connected to the bar 10 at point 34 and the lower end 35 of the handle 33 is adapted to bear against the hook portion 32 of the sliding collar 31. A metal strap 36 is connected to the sliding hook 32 and extends around the lower part 35 of the handle 33. The top portion of the collar 31 includes side walls 40 to which a lever 41 is pivotally connected. A spring 42 is positioned between the lever 41 and the top surface of the bar 10 biasing the righthand end of the lever 41 in an upward direction. A dog 43 is connected to one end of the lever 41 for engagement with the ratchet teeth 30 and is biased downwardly by the spring 42.

While the length adjustment for the bar 10 has been shown integral with the leverage producing means 12 it is to be understood that it is within the scope of the invention to separate the adjustment from the leverage producing means, and to put it at some other convenient place on the bar 10.

Figure 2:
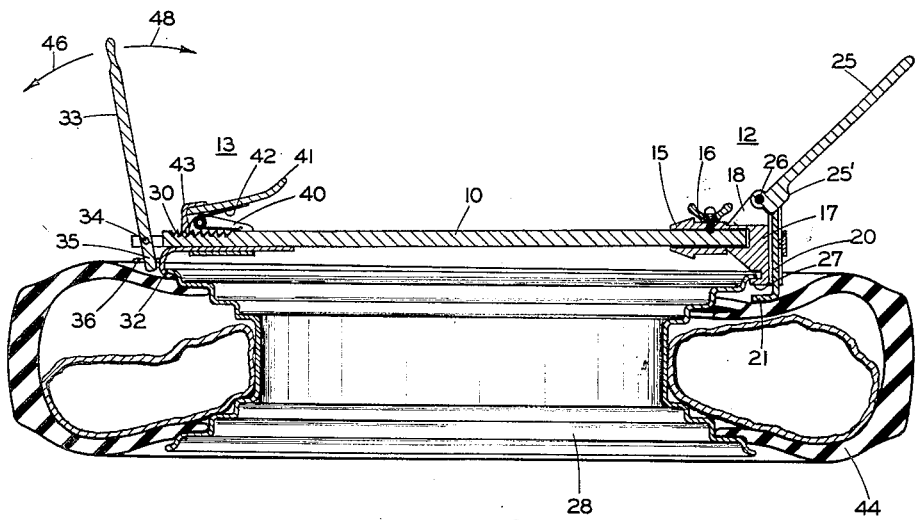
Figure 2 is a sectional side view of the tool operatively mounted on a rim.
Figure 3:
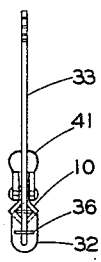
Figure 3 is an end view of the tool.

The tool is applied to the rim 28 for removing a tire 44 therefrom by inserting the edge of the rim into the slot 45 between the metal body 17 and the hook 27. The bar 10 is then laid diametrically across the rim and the length of the tool is adjusted to the diameter of the rim by loosening the wing nut 16 and by then pulling the bar 10 out or pushing it in to make the adjustment and the wing nut 16 is then tightened. The hook 32 is pushed down onto the tire 44 at a point on the rim diametrically opposite to the portion of the rim positioned in the notch 45. The handle 33 is then pulled in the direction of the arrow 46 to drive the hook portion 32 in underneath the rim and to cause hook 27 to enter between the rim 28 and the tire 44. This motion of the handle 33 causes the collar 31 with its connected lever 41 and dog 43 to slide to the right on the bar 10 and the spring 42 causes the dog 43 to continually be in engagement with the teeth 30. When the lever 33 is released a strong compressional force across the rim will be maintained as the dog 43 will not permit the bar 10 to slip with respect to the collar 31. The handle 25 is then swung in the direction of the arrow 47 into the position shown in Figure 2 causing an extended portion 25' to engage the rod 20 forcing it downwardly whereby the foot 21 forces the bead of the tire away from the rim 28. Once a small portion of the tire bead is separated from the rim the remainder of the tire may easily be loosened.

After the tire has been loosened and the tool is no longer needed it is easily removed by pushing down on the lever 41 which causes the dog 43 to lift up from the teeth 30. Handle 33 is then swung in the direction of arrow 48 whereby its end 35 engages the strap 36 and pulls the collar 31 and its connected mechanism to the left with respect to the bar 10 thereby bringing the hook 32 out from underneath the peripheral edge of the rim 28 so that the tool may easily be removed.

While the invention has been described with a certain degree of particularity it is to be realized that numerous changes may be made in the tool and in the arrangement of its parts without departing from the spirit and scope of the invention as hereafter claimed.

I claim as my invention:

1. A tool for loosening a tire from a rim comprising, in combination, a bar having ratchet teeth near the first end thereof, a collar including first hook means at said end thereof, said collar surrounding said bar at said ratchet teeth and including a dog for engaging said teeth, second hook means connected to the other end of said bar for connecting said bar diametrically across a tire rim with said hook means projecting underneath the periphery of said rim between said rim and the bead of said tire, a first lever pivotably connected to said bar at a location between said first end of said bar and said collar and connected to said collar for pulling said bar through said collar to clamp said tool on said tire rim, second force exerting lever means pivotably connected to said bar at the other end thereof for exerting force in a direction only normal to the direction of extension of said bar, foot means slidably connected to said bar at a location near said second lever means and adapted to be forcibly engaged by said lever means for pushing the bead portion of said tire away from said rim.

2. A tool for loosening a tire from a rim comprising, in combination; a bar; tire forcing means connected to one end of said bar and comprising block means, foot means mounted in said block means for sliding only in a direction substantially perpendicular to said bar, and lever means pivotably connected to said block means and adapted to engage said foot means to press said foot against the side wall of a tire; said block means including a hook for engaging the rim of a tire; and tightening means connected to the other end of said bar for tightly connecting said bar diametrically across the rim of the tire; said tightening means comprising a collar slidable on said bar and said bar including ratchet teeth, ratchet means connected to said collar and cooperating with said ratchet teeth for adjustably positioning said collar with respect to said bar, and a lever pivotably connected to said bar and in engagement with said collar for forcibly sliding said collar with respect to said bar.

3. A tool for loosening a tire from a rim comprising, in combination, a bar having ratchet teeth; block means having a passageway extending therethrough in a direction at right angles to said bar; means slidably connecting said block means to said bar and for fixedly securing said block means to said bar at a plurality of selected positions; lever means pivotably secured to said block means adjacent said passageway; foot means slidably mounted in said passageway for sliding motion only in a direction perpendicular to said bar and for engaging said lever means to be actuated thereby, said block means including hook means for engaging the outside peripheral edge portion of a tire rim; tightening means comprising a collar slidable on said bar at the location of said ratchet teeth, said collar means including ratchet means connected thereto and in engagement with the ratchet teeth on said bar for fastening said collar to said bar; a hook connected to said collar; and a lever pivotably connected to said bar adjacent said collar and in engagement with said hook connected to said collar for sliding said collar with respect to said bar.

JOHN FRANCIS KOHN.

REFERENCES CITED

The following references are of record in the file of this patent:

UNITED STATES PATENTS

| Number | Name | Date |
| --- | --- | --- |
| 1,043,424 | Hevey | Nov. 5, 1912 |
| 1,434,244 | Berry et al. | Oct. 31, 1922 |
| 1,475,519 | Snider | Nov. 27, 1923 |
| 1,605,462 | Peterson | Nov. 2, 1926 |
| 2,319,155 | Passanante et al. | May 11, 1943 |
| 2,367,638 | McCulloch | Jan. 16, 1945 |